Patented Aug. 4, 1931

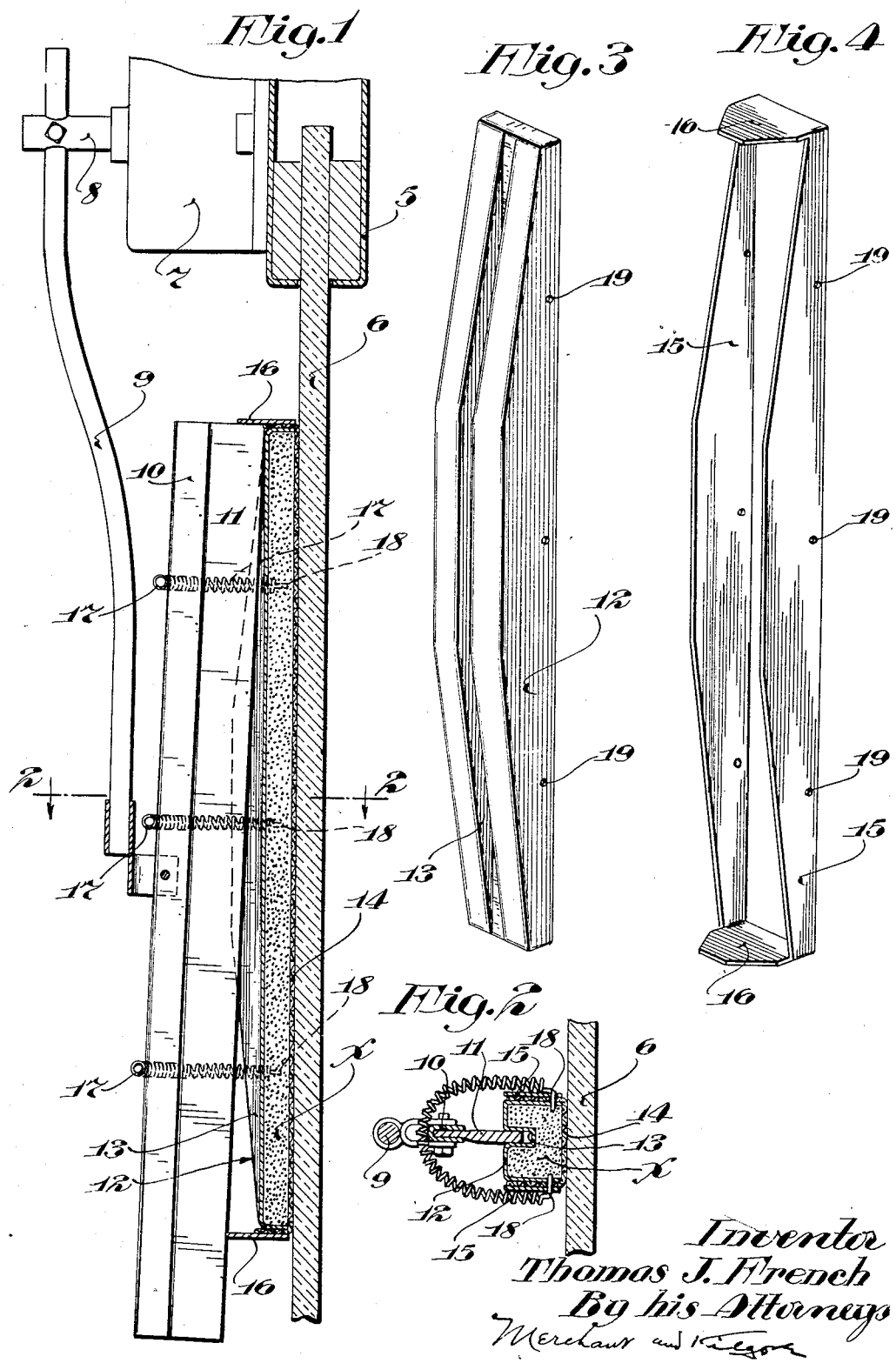

1,817,305

UNITED STATES PATENT OFFICE

THOMAS J. FRENCH, OF MINNEAPOLIS, MINNESOTA

WINDOW DEFROSTER

Application filed January 6, 1930. Serial No. 418,840.

My present invention has for its object the provision of a simple and highly efficient window defroster intended for general use but especially well adapted for use on the windows or windshield of an automotive vehicle and more particularly, in its preferred form, as an attachment for a commercial windshield wiper.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a view partly in side elevation and partly in vertical section showing the invention applied to a windshield wiper;

Fig. 2 is a view principally in transverse section taken on the line 2—2 of Fig. 1;

Fig. 3 is a perspective view of the container; and

Fig. 4 is a perspective view of the clamp.

The numeral 5 indicates the top member of the frame of an automotive windshield and the numeral 6 indicates the glass thereof.

A commercial windshield wiper, of well-known construction, is shown applied to the frame member 5 and includes an electric motor 7, a rock shaft 8, an oscillatory depending arm 9 on said shaft, a channel-shaped blade holder 10 pivoted to the free or outer end of the arm 9, and a rubber wiper blade 10 mounted in said holder.

The defroster in its preferred form, as shown, includes a trough-like container 11 the bottom of which, at its end portions, is upwardly inclined and has formed therein a longitudinally extended groove which affords a seat 13 for the wiper blade 10, as will hereinafter appear.

The container 12 has a displaceable porous closure 14 of linen or other material, the marginal edge portions of which overlap the sides and ends of said container. This closure 14 is held stretched over the container 12 by a rectangular clamp 15 which snugly fits around said container and holds the closure 14 tightly pinched between said clamp and container. Said container is filled with a thawing agent X such as salt or other chemical or chemicals. On each end of the clamp 15 is a rearwardly projecting abutment 16.

In applying the defroster attachment to the holder 10, the container 12 is positioned with the wiper blade 11 in the seat 13 and with the upper abutment 16 engaging the upper end of said blade and with the edge of said blade resting on the lower or other abutment 16. Obviously, the upper abutment 16 holds the defroster against downward movement on the blade 11. The purpose of providing an abutment 16, at each end of the clamp 15, is to permit the defroster to be turned end for end so that in case the thawing agent X works down in the lower portion of the container 12, said container may be reversed end for end.

The defroster is detachably secured to the blade holder 10 by a plurality of coil springs 17, as shown three, having on their ends hooks or pins 18 which extend through aligned holes in the sides of the clamp 15 and container 12 and detachably secure said clamp and springs to the container 12. These springs 17 extend transversely over the blade holder 10 and blade 11 and rest on the back of said holder intermediate of their ends with sufficient tension to yieldingly hold the container 12 and the lower abutment 16 against the outer edge of the wiper blade 11.

The projection of the wiper blade 11 into the seat 13 holds the defroster against lateral movement in respect to the blade holder 10, and the upper abutment 16 holds the defroster against downward movement in respect to said holder, as previously stated.

By reference to Fig. 2, it will be noted that the closure 14 overlies the outer edges of the sides and ends of the container 12 and that the outer edges of the clamp 15 are in substantially the same plane as the corresponding edges of said container so that they are out of contact with the glass 6 and only the closure 14 has contact therewith.

The purpose of using linen or a similar material for the closure 14 is that it readily absorbs moisture and as said closure comes in contact with moisture on the glass 6, said moisture will be almost instantly transmitted to the thawing agent X and form a brine that is wiped over the glass 6 by said closure during the oscillatory movement of the defroster by the windshield wiper and thereby thaw any frost or ice which may have accumulated on the glass 6 and prevent further frost or sleet from forming or accumulating on the glass 6 within the area wiped by the defroster so that a clear vision may be had.

What I claim is:

1. A window defroster comprising an open top rigid container, a flexible porous closure for the open top of the container, said container having in its bottom a groove-like seat for the blade of a window wiper, the bottom of said seat being below the open top of the container, means for securing the container to the holder for said blade, and a thawing agent in the container.

2. A window defroster comprising an open top container having a closure in the form of a porous wiping surface, and a thawing agent in the container, said container having in its bottom a groove-like seat for the blade of a window wiper and provided with an abutment arranged to engage the upper end of said blade and hold the container against downward movement on the blade.

In testimony whereof I affix my signature.

THOMAS J. FRENCH.